Feb. 28, 1967  S. M. ELLIS  3,306,048
GROUP THRUST COMPENSATOR
Filed May 1, 1964  6 Sheets-Sheet 2
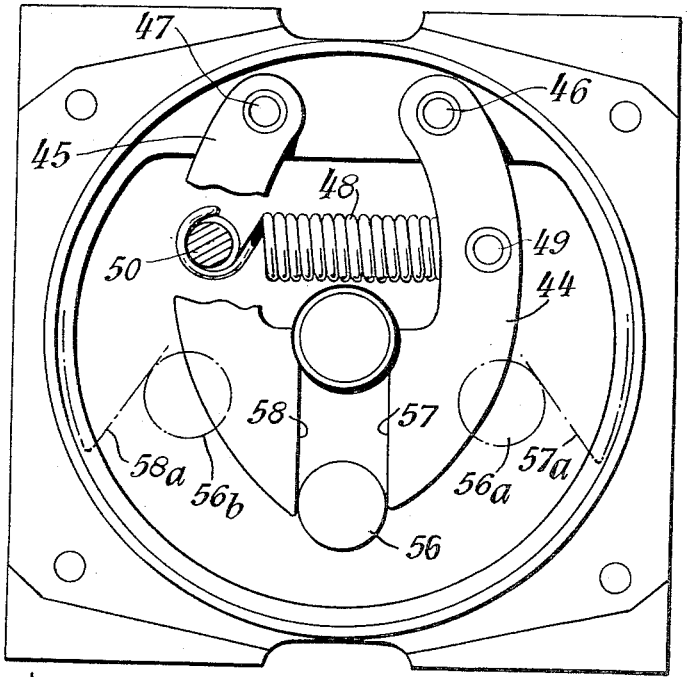
Fig.3.
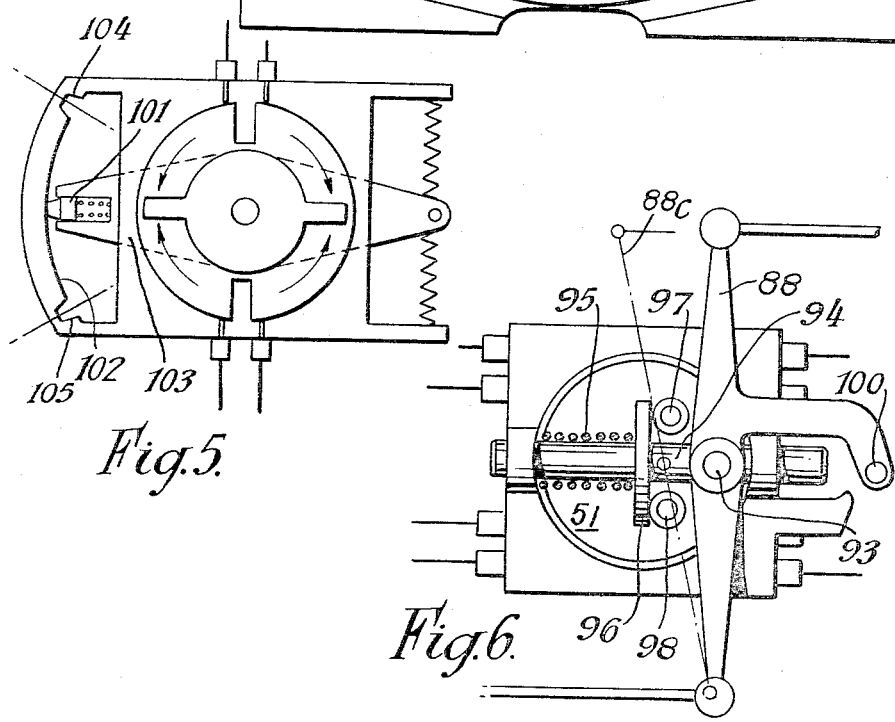
Fig.5.
Fig.6.
INVENTOR
STAFFORD M. ELLIS
BY
*Irmine v Smiley*
ATTORNEYS

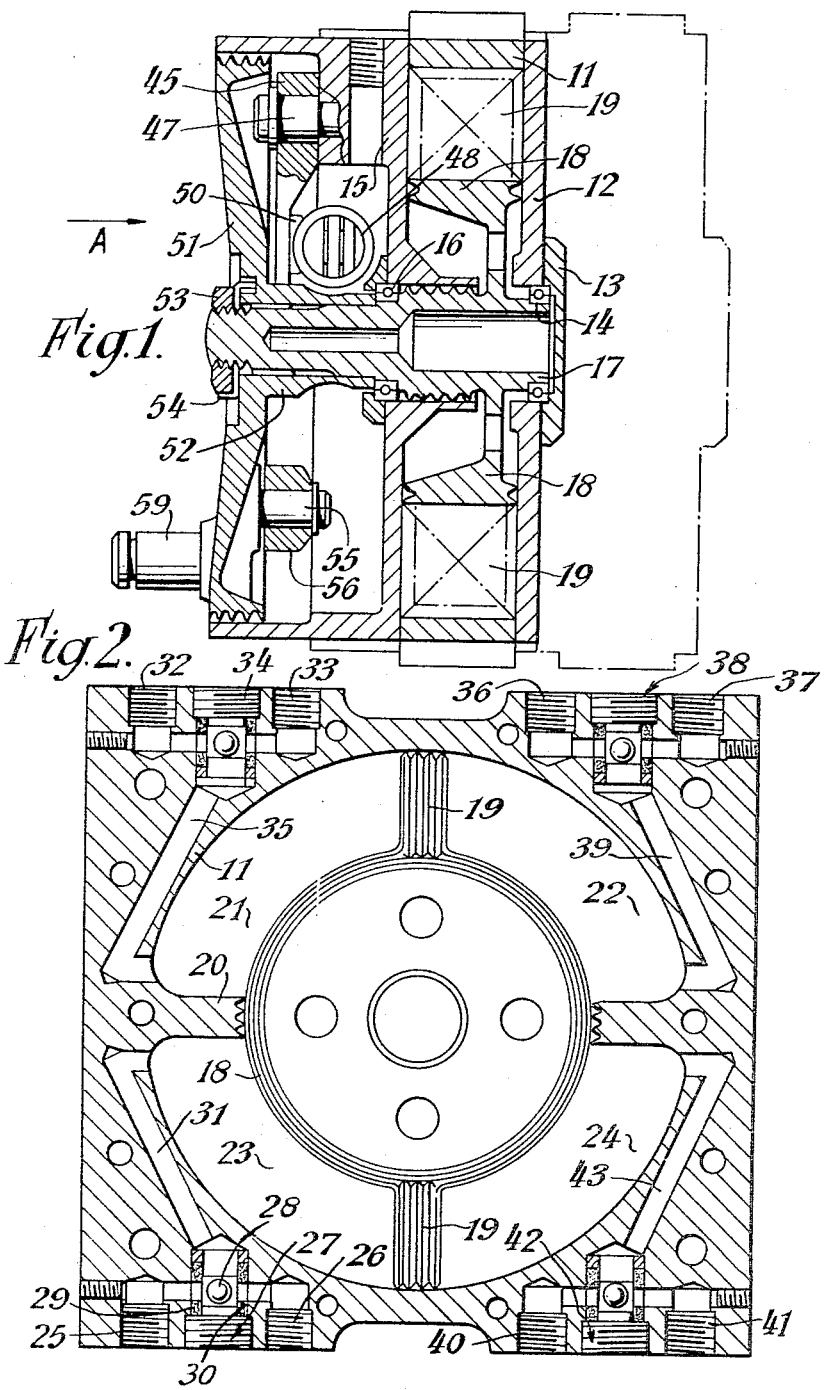

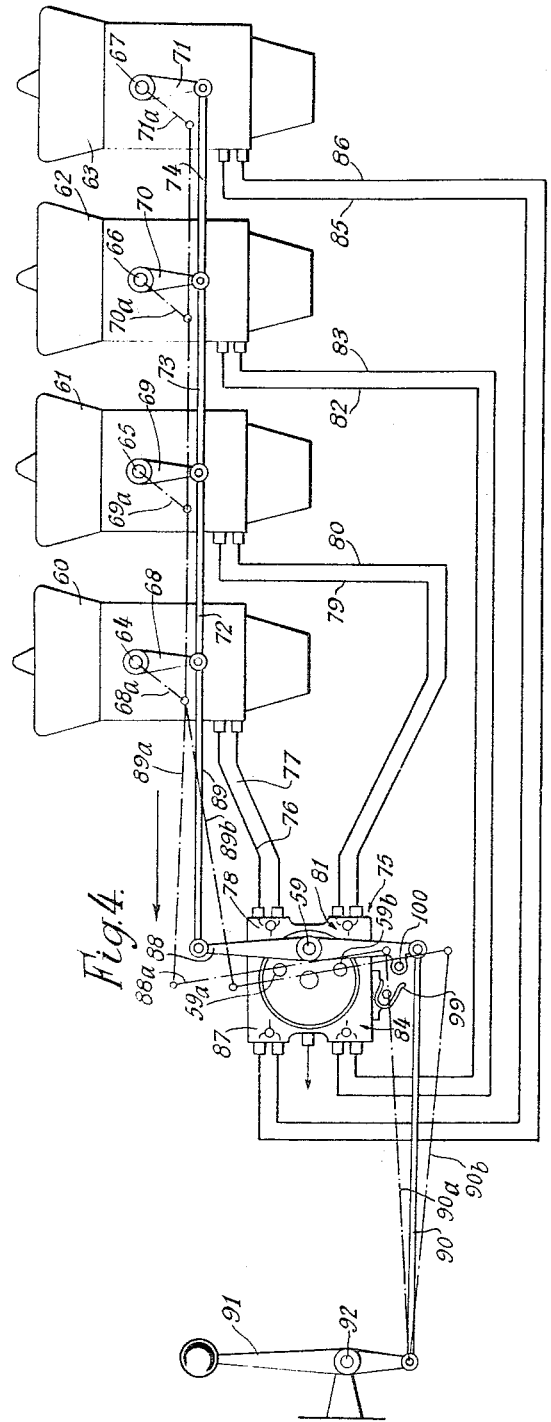

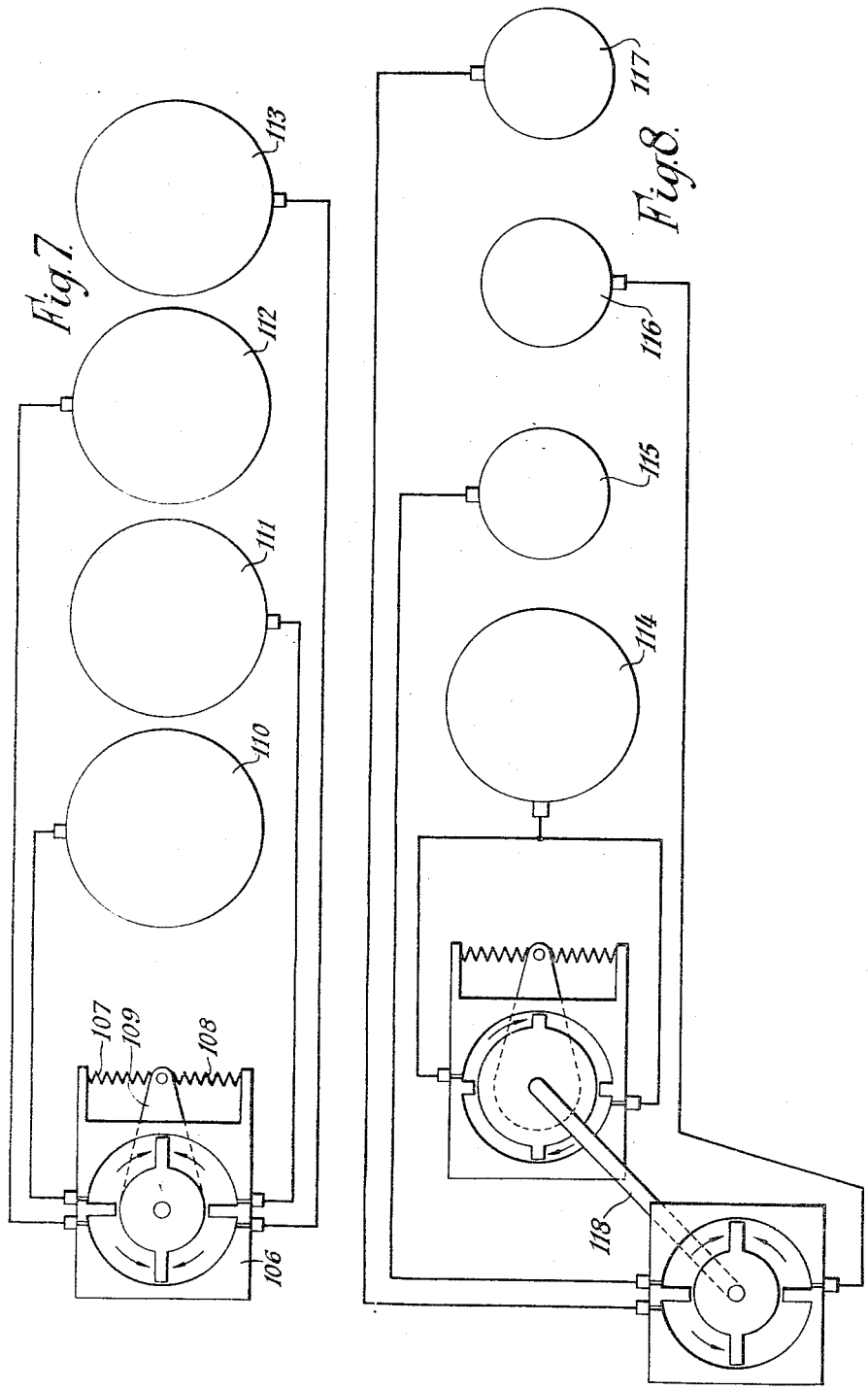

Feb. 28, 1967 S. M. ELLIS 3,306,048
GROUP THRUST COMPENSATOR
Filed May 1, 1964 6 Sheets-Sheet 5
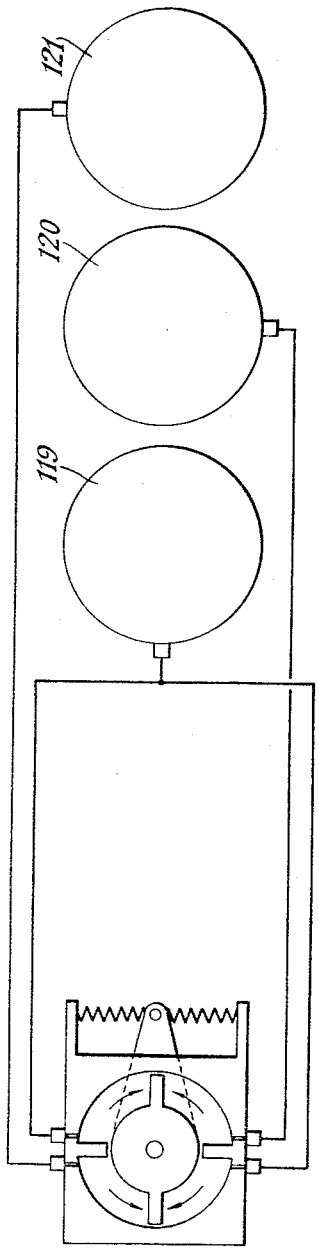
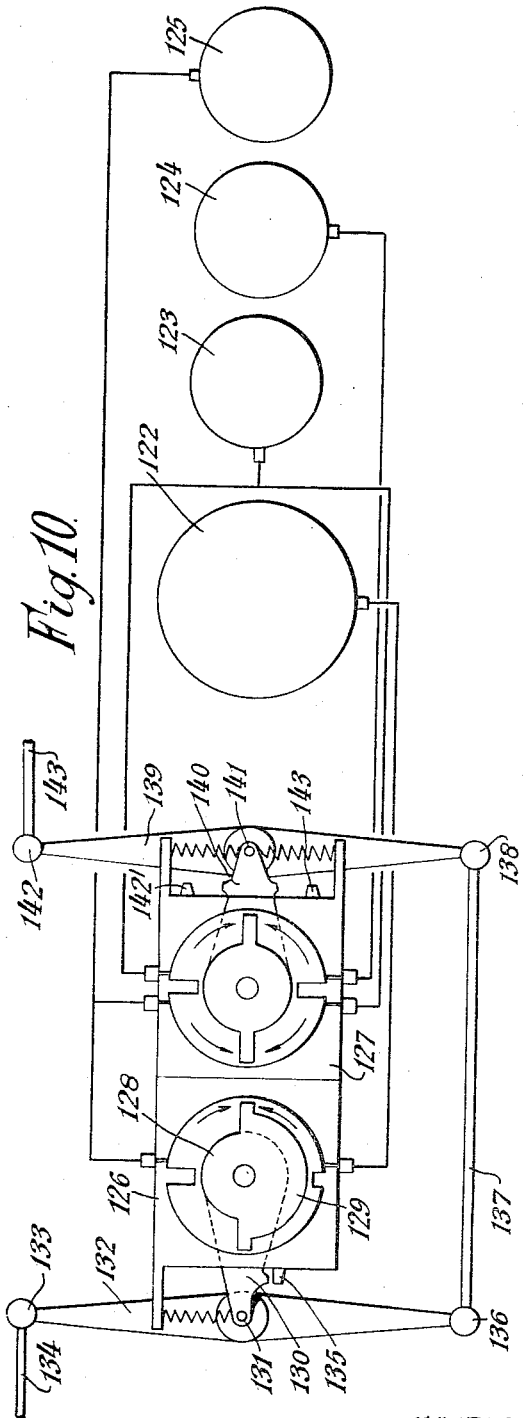
INVENTOR
STAFFORD M. ELLIS
BY
*Imirie & Smiley*
ATTORNEYS

STAFFORD M. ELLIS INVENTOR

United States Patent Office 3,306,048
Patented Feb. 28, 1967

3,306,048
GROUP THRUST COMPENSATOR
Stafford Malcolm Ellis, c/o Elliott Brothers (London) Limited, Century Works, Lewisham, London, England
Filed May 1, 1964, Ser. No. 364,087
Claims priority, application Great Britain, May 1, 1963, 17,256/63
13 Claims. (Cl. 60—243)

This invention relates to a group thrust compensator for an aircraft engine installation, that is to say, a device which functions automatically to cause a group of jet engines to deliver a predetermined total thrust despite variations in the thrust of individual engines of the group.

In VTOL aircraft employing a plurality of lift engines, possibly arranged in groups contained in wing pods, and possibly operating in conjunction with a further one or more engines delivering both a lift thrust and a forward thrust, it is of supreme importance that the total lift thrust is maintained at a predetermined constant level since a sudden variation, either upwards or downwards, in the lift thrust may have disastrous effects before the human pilot or an automatic stabiliser is able to take corrective action.

Accordingly, one object of the invention is to provide a group thrust compensator which functions automatically to maintain a predetermined thrust from a group of engines.

Another object is to provide a group thrust compensator which will maintain a predetermined thrust in spite of extreme variations in the thrust of individual engines resulting, for example, from the complete failure of one engine.

A further object is to provide a group thrust compensator capable of controlling any desired number of engines which is inherently simple in conception and has a high factor of reliability.

Still another object is to provide a group thrust compensator containing a novel form of fluid pressure responsive device.

Broadly, the invention consists of a group thrust compensator for maintaining the total lift thrust of a group of jet engines at a predetermined constant level comprising at least one fluid pressure responsive device having at least one double-acting piston and cylinder means, means to apply a fluid pressure derived from each engine corresponding to the lift thrust thereof when in operation to one side of the piston to oppose the fluid pressure derived from a different engine applied to the other side of said piston, and linkage coupling said piston to the throttle controls of all the engines, arranged so that a reduction in the fluid pressure derived from one engine causes the throttle openings of all the engines to be increased.

If there are more than one fluid pressure responsive device the pistons thereof are coupled together by mechanism to produce a movement equal to the algebraic sum of the movements of all the pistons for application to the throttle control linkage.

The fluid pressure responsive device may comprise one or more pistons of normal type working in cylinders or they may comprise a cylindrical housing divided by radial walls extending inwardly to the cylindrical hub of a rotor which has radial vanes extending outwardly to the cylindrical inner surface of the housing to form closed chambers the volume of which may be varied by rotating the rotor in one direction or the other.

In order that the invention may clearly be understood certain embodiments thereof will now be described by way of example with reference to the accompanying drawings in which:

FIGURE 1 is a sectional elevation through one form of fluid pressure responsive device;

FIGURE 2 is a cross-sectional elevation of the same device taken at right angles to that of FIGURE 1 and looking in the direction of the arrow A;

FIGURE 3 is a front view of the device of FIGURES 1 and 2 also looking in the direction of the arrow A;

FIGURE 4 is a diagrammatic layout of an engine installation including a group thrust compensator according to the invention;

FIGURE 5 is a diagrammatic view of a latch mechanism attachable to the device of FIGURES 1 to 3;

FIGURE 6 shows a modification of the device of FIGURES 1 to 3 to provide linear geometry in the linkage;

FIGURES 7, 8, 9 and 10 illustrate typical arrangements of the group thrust compensator as applied to different groupings of engines.

Figure 11:
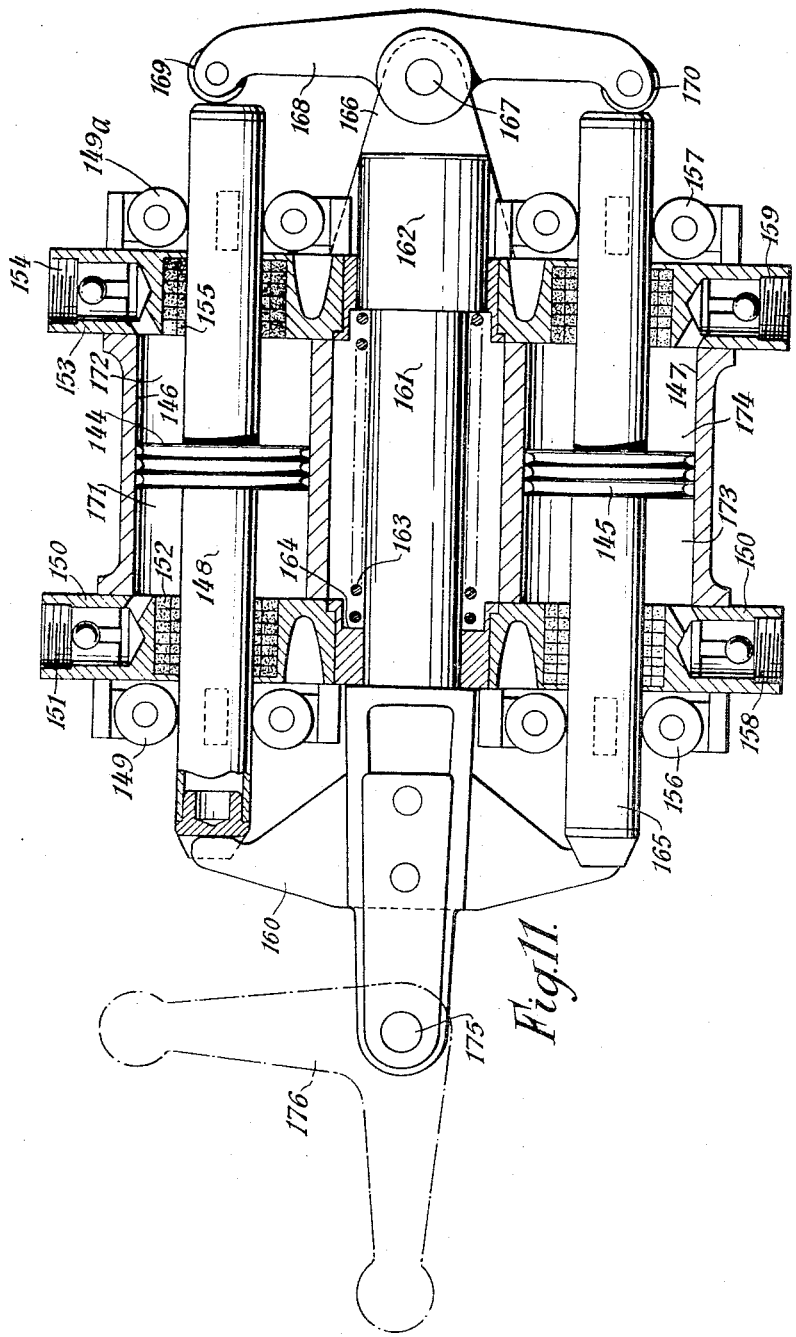
FIGURE 11 shows a different kind of fluid pressure responsive device.

Referring initially to FIGURES 1 and 2, a fluid pressure responsive device for use with the group thrust compensator according to the invention comprises a housing 11 with a rear end plate 12 supporting a bearing cap 13 containing a bearing 14, and a front plate 15 containing a second bearing 16, the two bearings supporting a rotor shaft 17 which carries a rotor having a tubular portion 18 from which two radial vanes 19 project to the full diameter of the housing 11. The housing 11 is cylindrical internally except for two inwardly projecting walls 20, the inner ends of which come into closely spaced relation with the tubular portion 18 of the rotor. The edges of the tubular portion 18, the vanes 19 and the inner ends of the walls 20 are provided with grooves to form labyrinth seals. By the walls 20 and the vanes 19 the cylindrical housing 11 is divided into four chambers, respectively 21, 22, 23 and 24, which have equal volumes when the rotor is in the position shown in FIGURE 2. Rotation of the rotor anticlockwise in FIGURE 2 will reduce the volumes of chambers 21 and 24 while increasing the volumes of chambers 22 and 23 and, conversely, clockwise rotation of the rotor will increase the volumes of chambers 21 and 24 while reducing the volumes of chambers 22 and 23. Two pipe connections, respectively 25 and 26, are provided at the lower left-hand region of the housing 11 and between these is an auto-selector valve, generally indicated by 27, having a ball 28 which may move to and fro in a suitably formed channel to engage the seats 29 or 30 at the extremities of its travel. From the valve 27 a duct 31 leads to the chamber 23. If fluid pressure is supplied to the two connections 25 and 26 through two independent pipes from the same pressure source, then the fluid will flow from both pipes past the valve 28, through the duct 31 and into the chamber 23. If one of the pipes should fail, so that heavy leakage occurs, then the fluid pressure from the remaining pipe will act to force the ball 28 against the seat 29 or 30 associated with the failed pipe, thereby shutting off this pipe while permitting fluid flow to continue from the remaining pipe through the duct 31 and into the chamber 23. In exactly similar manner, two pipe connections 32 and 33 with an intervening auto-selector valve 34 are provided to feed fluid under pressure through a duct 35 into the chamber 21; two fluid pressure connections 36 and 37 with an intervening auto-selector valve 38 are provided to feed fluid under pressure through a duct 39 into the chamber 22, and two fluid pressure connections 40 and 41 with an intervening auto-selector valve 42 are provided to feed fluid pressure through a duct 43 into the chamber 24. By this arrangement a redundant fluid feed system is accommodated.

The front plate 15 of the fluid pressure responsive device has mounted thereon two arms 44 and 45, FIGURE 3, pivoted respectively on pivots 46 and 47, with a spring 48 coupled between pins 49 and 50 on the respective arms, so that the two arms are drawn towards each other and into contact with the hub 52 of a disc-shaped part 51, and a roller 56. The disc-shaped part 51 is attached and located by splines or keys on to the end of the rotor shaft 17 and is secured by means of a nut 53 and a tab washer 54. Projecting inwardly from the part 51 is a pin 55 carrying the roller 56, shown in section in FIGURE 1 and in chain dotted lines in FIGURE 3, which is in contact with flat faces 57 and 58 provided respectively on the arms 44 and 45. An actuating pin 59 is secured by suitable means to the outer face of the part 51 and the said part 51 has grooves formed around its outer cylindrical periphery to constitute a labyrinth seal with the inner diameter of the recessed part of the front plate 15.

Referring to FIGURE 4, four jet engines, respectively 60, 61, 62 and 63 are shown with respective throttle control shafts 64, 65, 66 and 67, having mounted thereon respectively control levers 68, 69, 70 and 71. The throttle control levers 68 to 71 are linked together by rods 72, 73 and 74 so that they all move simultaneously. The fluid pressure responsive device shown in FIGURES 1 to 3 is generally indicated in FIGURE 4 by the reference 75.

Each of the lift engines 60 to 63 is provided with a source which produces a fluid pressure dependent upon and proportional to the pressure in the respective jet pipes, and therefore corresponding to the thrust output of the engine. This may consist of a pivot tube in the jet, or a static tapping, or it might consist of two identical venturis, one having its inlet closed, the difference in pressure in the two venturis being a measure of the thrust pressure in the jet. Whatever the nature of the sources of fluid pressure may be, the source comprised in engine 60 is connected by two pipes 76 and 77 to the pair of inlets and an auto-selector valve, generally indicated by 78, which correspond to the inlets and auto-selector valve 40, 41 and 42 in FIGURE 2; the fluid pressure source of engine 61 is connected by two pipes 79 and 80 to the pair of inlets and auto-selector valve, generally indicated by reference 81, which correspond to the inlets and auto-selector valve 25, 26 and 27 of FIGURE 2; the pressure source of engine 62 is connected by a pair of pipes 82 and 83 to the pair of inlets and the auto-selector valve, generally indicated by reference 84, which correspond to the inlets and auto-selector valve 32, 33 and 34 of FIGURE 2; and the pressure source of engine 63 is connected by a pair of pipes 85 and 86 to the pair of inlets and auto-selector valve, generally indicated by 87, which correspond to the inlets and auto-selector valve 36, 37 and 38 of FIGURE 2.

A lever 88 has a central hub which is mounted on the actuating pin 59 and has its one end connected through a control rod 89 to the throttle control lever 68 and hence to the throttle control levers of the other three engines 61, 62 and 63. The other end of the lever 88 is connected through a rod 90 to one end of a manual throttle control lever 91 pivoted at 92.

In operation, the fluid pressures from the four engines 60, 61, 62 and 63 are applied respectively to the chambers 24, 23, 21 and 22. If all the engines are working normally and the fluid pressures derived therefrom are equal, then no turning moment is exerted upon the rotor of the device 75 and the two arms 44 and 45, acted upon by the spring 48, keep the roller 56 in a central position and therefore hold the rotor in the position shown in FIGURE 2. If the fluid pressure from the engine 60, for example, should suddenly fail due, say, to complete engine failure, the fluid pressure in the chamber 23, which remains at its original level will act on the lower vane 19 in FIGURE 2 to cause the rotor to rotate in the anticlockwise direction in that figure, and the roller 56 will move the arm 44 outwards until the face 57 is brought to the position 57a indicated in chain dotted lines, the roller 56 being then in the position 56a shown in FIGURE 3. This causes the pin 59 to move to a position 59a (FIGURE 4) carrying with it the lever 88, so that the rod 90, the lever 88 and the rod 89 assume the positions indicated by the respective chain dotted lines 90a, 88a and 89a, which represent the centre lines of those parts, thus causing the throttle levers 68 to 71 to be moved respectively to the positions 68a, 69a, 70a and 71a. It is arranged that movement in this particular direction causes all the engine throttles to be opened to compensate for the loss of thrust in the engine 60. The movement of the lever 68 will, of course, have no effect as the engine 60 has failed.

If the failure occurs in the engine 61 instead of the engine 60, then the pressure in the chamber 23 falls to zero and the rotor is moved in the clockwise direction in FIGURE 2 by the superior pressure in the chamber 24, the arm 45 is moved outwardly so that the face 58 comes to the position 58a and the roller 56 is moved to position 56b. The pin 59 is now moved to a position 59b and the rod 90, the lever 88 and the rod 89 respectively move to positions 90b, 88b and 89b, again indicated by chain dotted lines, thereby causing a similar movement of the throttle levers 68 to 71.

A complete failure of either of the engines 62 or 63 will produce the effect which has just been described.

It will, of course, be understood that the initial positioning of the throttle controls as shown in full lines in FIGURE 4 is achieved by setting the manual throttle control lever 91.

While the operation of the group thrust compensator has been described above in relation to the complete failure of an engine, it will be realised that a partial failure will tend to produce the same effect but the arm 44 or 45, as the case may be, may not be moved to its extreme position. A graduated compensation which just offsets the drop in power of the defaulting engine may be achieved by proper selection of the fluid pressure delivered by the engine in relation to thrust output, the areas of the vanes 19 acted upon by the engine fluid pressure, the strength of the spring 48 and the proportioning of the throttle control linkage.

It has already been explained that if the engine 60 fails then the pressure in the chamber 24 will disappear and the rotor will be moved anticlockwise under the influence of the pressure in the chamber 23, and this in turn will result in the opening of the engine throttles. If the engine 61 should fail subsequently the pressure in the chamber 23 will also disappear and the rotor of the compensator will move back to its original central position under the influence of the spring 48 as if no engines had failed at all. This malfunctioning is avoided by including the arrangement shown diagrammatically in FIGURE 5. As will be seen, the rotor arm is fitted with a spring-loaded pin 101 which is normally in the centre of a curved track 102 when the rotor is in its central position, but if one of the engines fails and the rotor shaft is, in consequence, rotated the spring-loaded pin 101 is moved by the arm 103 in a clockwise or anticlockwise direction along the track 102 until it engages one or other of two notches 104 and 105. Once the pin 101 is engaged in one of the notches the rotor of the compensator is not allowed to move back to its original central position, even if a second engine should fail.

FIGURE 6 shows a modification which enables the movement of the throttle control linkage to be made linear. Instead of placing the throttle lever 88 on the pin 59, which swings with the part 51, the lever 88 is placed on a pin 93 fixed to a rod 94 which is acted upon by a spring 95 so that a shoulder 96 on the rod 94 is pressed into contact with two rollers, respectively 97 and 98, mounted on the part 51. When the part 51 is rotated with the rotor in response to a change in the pressure in one of the chambers 21 to 24, the rod 94 is moved back linearly against the force of the spring 95 and the pin 94 carrying the lever 88 is moved with it. The lever 88 then assumes the position 88c.

When the engines are being started up, one by one, the fluid pressure responsive device 75 will behave as if the engines which have not yet been started had in fact failed, and to prevent this a guide slot 99 may be provided on the body of the device 75 cooperating with a pin 100 on the lever 88 to make the group thrust compensator ineffective when starting engines.

FIGURES 7 to 10 show the application of the group thrust compensator to different arrangements of engines. In these diagrams, for the sake of clarity, the spring 48 of the fluid pressure responsive device is represented by two diagrammatic springs 107 and 108 attached to an arm 109. This arrangement would effectively be the same as the arrangement shown in FIGURE 3 but is clearer in diagram form. In FIGURE 7 four identical engines 110, 111, 112 and 113 are shown and the fluid pressure sources associated with the four engines are respectively connected to the four chambers in the fluid pressure responsive device 106, as described in relation to FIGURE 4.

In FIGURE 8 one large engine 114 and three small engines, respectively 115, 116 and 117, are to be catered for and one method of coping with this problem, according to the invention, is to connect the pressure source associated with the large engine 114 to two opposite chambers in one fluid pressure responsive device and to couple the three smaller engines 115, 116 and 117 to three of the four chambers of a further fluid pressure responsive device having its shaft mechanically coupled to the first device in such a manner that the pressures of two of the small engines cancel out in the second device and the pressure of the third engine tends to turn the shaft 118 in a direction which is opposite to that in which it is urged by the fluid pressure from the large engine.

In FIGURE 9 three engines 119, 120 and 121, of identical size, are to be dealt with and the solution of this problem, according to the invention, is to connect the pressure source of one of the engines to two opposite chambers in the fluid pressure responsive device, and to connect the sources of the other two engines respectively to the remaining two chambers.

FIGURE 10 shows another method of dealing with the combination of one large engine and three identical smaller engines as shown in FIGURE 8. In FIGURE 10, 122 is the large engine and the three smaller ones are respectively given references 123, 124 and 125. Two fluid pressure responsive devices, respectively 126 and 127, are employed and the rotors of the shafts are not directly coupled together as in the example of FIGURE 8. Instead, two arms coupled to the respective rotor shafts are mechanically linked by rods and these will be referred to later. The fluid pressure from the large engine 122 is applied to one chamber of the device 126 and the pressure from the small engine 125 is applied to an adjacent chamber in the same device but, as will be observed, the effective areas of the vanes are different, due to the fact that one half 128 of the circular part of the rotor is of smaller diameter than the other half 129. The pressure from the small engine 123 is applied to two opposite chambers in the device 127 and is opposed partly by the pressure from the engine 125 which is applied to one of the remaining chambers and partly by the pressure from the engine 124, which is applied to the remaining chamber of the device 127. The rotor shaft of the device 126 has an arm 130 mounted upon it and the end of this arm carries a pin 131 on which a lever 132 is carried. The one end 133 of the lever 132 is coupled to a throttle control rod 134 which is equivalent to the throttle control rod 90 of FIGURE 4. A stop 135 is fitted to ensure that the arm 130 may only move in the clockwise direction on the diagram. The other end 136 of the lever 132 is coupled by a rod 137 to one end 138 of a further lever 139 carried on the end of an arm 140 attached to the rotor of the device 127. The other end 142 of the lever 139 is coupled to a rod 143 which is equivalent to the rod 89 in FIGURE 4.

A study of the linkage in FIGURE 10 will show that it operates in the same way as the linkage shown in FIGURE 4 in that the failure of any one of the four engines will cause all the engine throttles to be opened. There is, however, a difference in the degree of opening. If the large engine 122 fails the rotor of the device 126 will move clockwise, and its movement is unlimited so that the throttles of the three smaller engines are opened to a large extent because the arm 130 swings clockwise to its full extent. A consideration of the linkage will show that this has the effect of pulling the rod 143 to the left on the diagram, which is the correct direction to open the engine throttles. If one of the smaller engines fails the arm 30 remains stationary because if the failed engine should be the engine 125 there will be no opposition to the pressure of the large engine but the stop 135 prevents the arm 130 from swinging in the anticlockwise direction. Failure of the engine 125 will, however, result in the arm 140 associated with the device 127 swinging in the clockwise direction, and the effect will be as described in relation to FIGURE 4. Precisely the same effect is produced if the engine 124 fails. On the other hand, if the engine 123 fails then the arm 140 will swing in the anticlockwise direction. The swing of the arm 140 is, however, limited by two stops 142 and 143 so that the failure of any one of the three engines will not result in a throttle opening to the same extent as the failure of the large engine.

FIGURE 11 shows an alternative form of fluid pressure operated device containing two double-acting pistons 144 and 145 adapted to reciprocate in respective cylinders 146 and 147. The piston 144 is mounted on a piston rod 148 adapted to reciprocate between two sets of rolling bearings, respectively 149 and 149a, mounted at opposite ends of the cylinder. Between the rolling bearings 149 and the adjacent end of the cylinder is an end plate 150 containing one or a pair of inlets 151 there being an autoselector valve between the inlets if there are two, as described in relation to FIGURE 2. Inside the end plate 150 is a labyrinth seal 152. Similar arrangements are provided at the other end of the cylinder 146, in the form of a second end plate 153 with one or two inlets 154 and a labyrinth seal 155. Corresponding arrangements are provided for the cylinder 147, there being rolling bearings 156 and 157 carried respectively by the end plates 150 and 153, and inlets, respectively 158 and 159. A yoke 160 is fixed to a central stem 161 and is provided with an end cap 162 which bears upon one end of a spring 163, of which the other end bears against a shoulder 164 in the end plate 150. Two arms of the yoke 160 bear respectively upon the piston rod 148 associated with the piston 144 and a piston rod 165 associated with the piston 145. A forked member 166 projects outwardly from the end plate 153 and a pin 167 passes through the ends of the fork and through a suitable bore in an arm 168 having at one end a roller 169 which bears upon the end of the piston rod 148 remote from the yoke 160, while the other end of the arm 168 carries a roller 170 which bears upon the end of the piston rod 165 remote from the yoke 160. The arrangement of the pistons and cylinders provides four closed chambers, respectively 171, 172, 173 and 174, and these chambers are connected respectively to the fluid pressure sources on four engines or, if desired, three engines, by using the arrangement described in relation to FIGURE 9.

Assuming that the engines are working normally, the pistons 144 and 145 are kept in their central positions by the spring 163 which keeps the yoke 160 pressed against the adjacent ends of the piston rods 148 and 165.

If the engine associated with the chamber 171 should fail, then the pressure in the chamber 172 will cause the piston 144 to move to the left, producing a similar movement of the piston rod 147 and hence a corresponding movement of the yoke 160, which takes with it the central stem 161 thus compressing the spring 163. The movement of the piston rod 148 to the left leaves the arm 168 free, assuming that the pressures in the chambers 173 and 174 are exactly balanced.

If the engine associated with the chamber 172 should ail, then the piston 144 will move to the right in FIGURE 11 under the influence of the pressure in the chamber 171 and through the medium of the arm 168 will force the piston rod 165 and the piston 146 to move to the left, carrying with it the yoke 160 so that the central stem 161 is again moved to the left to compress the spring 163.

If the engine associated with the chamber 173 should fail, the piston 145 is moved to the left under the influence of the pressure in the chamber 174 and this causes a movement to the left of the piston rod 165 and the yoke 160. If the pressure in the two chambers 171 and 172 are exactly balanced the piston 144 will stay where it is and the arm 168 will be free.

If the engine associated with the chamber 174 should fail, then the piston 145 moves to the right in FIGURE 11 taking with it the piston rod 165 which, through the arm 168, acts upon the piston rod 148, forcing it to move with its piston 144 to the left, thereby moving the yoke 160 to the left and again compressing the spring 163.

It will be observed that a failure of the pressure in any one of the chambers 171, 172, 173 or 174 associated with the respective engines has precisely the same result in that the yoke 160 is moved to the left. This yoke carries at its outer end a pin 175 upon which is mounted a bellcrank 176 whose arms may be connected to linkage associated, on the one hand, with the engine throttles and, on the other hand, with a manual throttle control, to produce exactly the same effects as the linkage described in connection with FIGURE 4.

I claim:

1. A group thrust compensator for correcting for disturbance of the thrust of a group of thrust producing engines caused by malfunction of a said engine, including at least one fluid pressure responsive device, at least one movable member in each said device, means for balancing on opposite sides of at least one part of each said member fluid pressure derived from each engine corresponding to the thrust thereof when in normal operation against the fluid pressure derived from another said engine so that upon unbalance in said pressures occurring movement of at least one member takes place, and means associated with the last said member and responsive to said movement thereof arranged so that a reduction in the thrust of one of said engines opens the throttles of all of said engines.

2. A group thrust compensator according to claim 1 wherein the means for balancing on opposite sides of one part of said member includes fluid pressure derived from a first said engine against the fluid pressure derived from a second said engine, and the means associated with the said member and responsive to said movement thereof is effective by a reduction in the thrust of one of said first and second engines to open the throttles of all said engines.

3. A group thrust compensator according to claim 2 wherein said means for balancing on opposite sides of another part of the said movable member includes fluid pressure derived from a third said engine against the fluid pressure derived from a fourth said engine, and the means associated with the said member and responsive to said movement thereof is effective by a reduction in the thrust of one of any of said first, second, third and fourth engines to open the throttles of all said engines.

4. A group thrust compensator according to claim 3 wherein the movement of the movable member is an angular displacement.

5. A group thrust compensator as claimed in claim 4 wherein each fluid responsive device includes a cylindrical housing divided by a number of radial walls extending inwardly, a rotor having a hub and the same number of radial vanes extending outwardly therefrom, the radial walls of the housing extending inwardly to the hub of the rotor and the vanes of the rotor extending outward to the cylindrical inner surface of said housing, whereby closed chambers are formed the volumes of which may be varied by rotating the rotor in one direction or the other.

6. A group thrust compensator according to claim 5 wherein each said chamber is connected to receive the fluid pressure from one said engine.

7. A group thrust compensator according to claim 6 including means for achieving graduated compensation for the drop in thrust of a malfunctioning engine.

8. A group thrust compensator according to claim 7 including means for preventing failure of operation of the compensator in the event of the malfunction of two engines the fluid pressures from which are applied one on each side of the same said part.

9. A group thrust compensator according to claim 8 including a guide member having a slot, and a spring loaded pin carried by the movable member abutting said guide member and which on failure of one said engine engages said slot in said guide member thereby preventing return of said movable member and movable part to an unoperated position.

10. A group thrust compensator as claimed in claim 1 including a plurality of said fluid pressure responsive devices, and means coupling all the movable members thereof to produce an output movement for application to the throttles of all of said engines.

11. A group thrust compensator according to claim 1 including at least two movable members in said devices, means for balancing on opposite sides of one part of one said member fluid pressure derived from a first said engine against the fluid pressure derived from a second said engine and for balancing on opposite sides on one part of another said member fluid pressure derived from a third said engine against fluid pressure derived from a fourth said engine so that upon unbalance of pressures occurring movement of at least one of said members takes place, and said means associated with the said members and responsive to said movement thereof is effective by a reduction in thust of one of said first, second, third and fourth engines to open the throttles of all said engines.

12. A group thrust compensator according to claim 11 wherein the said movement of the movable member is a linear displacement.

13. A group thrust compensator according to claim 12 wherein the pressure responsive device includes two cylinders and the said movable members are double acting pistons one in each said cylinder.

References Cited by the Examiner

UNITED STATES PATENTS

| | | | |
|---|---|---|---|
| 2,853,851 | 9/1958 | Chandler | 60—97 X |
| 2,942,416 | 6/1960 | Buckingham | 60—39.15 |
| 3,176,936 | 4/1965 | Howard et al. | 60—39.15 X |
| 3,234,740 | 2/1966 | Moore | 60—39.15 X |

MARK NEWMAN, *Primary Examiner.*

CARLTON R. CROYLE, *Examiner.*

D. HART, *Assistant Examiner.*